United States Patent
Lee et al.

(10) Patent No.: US 10,877,273 B2
(45) Date of Patent: Dec. 29, 2020

(54) OPTICAL WINDOW SYSTEM AND SEE-THROUGH TYPE DISPLAY APPARATUS INCLUDING THE SAME

(71) Applicant: SAMSUNG ELECTRONICS CO., LTD., Suwon-si (KR)

(72) Inventors: Changkun Lee, Seoul (KR); Geeyoung Sung, Daegu (KR); Wontaek Seo, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 15/868,145

(22) Filed: Jan. 11, 2018

(65) Prior Publication Data

US 2019/0049732 A1 Feb. 14, 2019

(30) Foreign Application Priority Data

Aug. 9, 2017 (KR) .......................... 10-2017-0101346

(51) Int. Cl.
*G02B 27/01* (2006.01)
*G02B 5/30* (2006.01)
(Continued)

(52) U.S. Cl.
CPC .......... *G02B 27/0172* (2013.01); *G02B 3/10* (2013.01); *G02B 5/30* (2013.01); *G02B 27/0081* (2013.01);
(Continued)

(58) Field of Classification Search
CPC .............. G02B 27/017; G02B 27/0172; G02B 2027/0174; G02B 2027/0178
See application file for complete search history.

(56) References Cited

U.S. PATENT DOCUMENTS 5,982,343 A * 11/1999 Iba ..................... G02B 27/0172
345/8
9,129,295 B2 9/2015 Border et al.
(Continued)

FOREIGN PATENT DOCUMENTS

JP 07043633 A 2/1995
JP 7270714 A 10/1995
(Continued)

OTHER PUBLICATIONS

Communication dated Jan. 8, 2019, issued by the European Patent Office in counterpart European Application No. 18186152.7.
(Continued)

*Primary Examiner* — Robert E. Tallman
(74) *Attorney, Agent, or Firm* — Sughrue Mion, PLLC

(57) ABSTRACT

An optical window system includes: a path conversion member configured to change a path of light of a first image from a first direction to a second direction, the path conversion member being translucent to light incident in the second direction; and a focusing member configured to focus the light of the first image in the second direction. Moreover, the path conversion member is configured to occupy a space according to an angle, defined by a first length of the path conversion member in the first direction and a second length of the path conversion member in the second direction, satisfying a predetermined condition, thereby reducing a system thickness and providing a wide field of view.

33 Claims, 13 Drawing Sheets

(51) Int. Cl.
  *G02B 27/00*   (2006.01)
  *G02B 3/10*    (2006.01)
(52) U.S. Cl.
  CPC ............... *G02B 2027/0123* (2013.01); *G02B 2027/0174* (2013.01)

(56) References Cited

U.S. PATENT DOCUMENTS

| | | |
|---|---|---|
| 9,494,800 B2 | 11/2016 | Border et al. |
| 9,581,814 B2 | 2/2017 | Nowatzyk |
| 2003/0165017 A1 | 9/2003 | Amitai |
| 2005/0140644 A1 | 6/2005 | Mukawa |
| 2014/0140654 A1 | 5/2014 | Brown et al. |
| 2016/0033771 A1 | 2/2016 | Tremblay et al. |
| 2016/0062121 A1 | 3/2016 | Border et al. |
| 2017/0045745 A1 | 2/2017 | Piskunov et al. |
| 2017/0123204 A1 | 5/2017 | Sung et al. |

FOREIGN PATENT DOCUMENTS

| | | |
|---|---|---|
| JP | 1195160 A | 4/1999 |
| JP | 2004-102204 A | 4/2004 |
| JP | 4543747 B2 | 9/2010 |
| KR | 10-2014-0066258 A | 5/2014 |
| KR | 10-2015-0136601 A | 12/2015 |

OTHER PUBLICATIONS

Communication dated Apr. 9, 2019, issued by the European Patent Office in counterpart European Application No. 18186152.7.

\* cited by examiner

OPTICAL WINDOW SYSTEM AND SEE-THROUGH TYPE DISPLAY APPARATUS INCLUDING THE SAME

CROSS-REFERENCE TO RELATED APPLICATION

This application claims priority from Korean Patent Application No. 10-2017-0101346, filed on Aug. 9, 2017, in the Korean Intellectual Property Office, the disclosure of which is incorporated herein in its entirety by reference.

BACKGROUND

1. Field

The present disclosure relates to an optical window system and a see-through type display apparatus.

2. Description of the Related Art

Head mounted displays providing virtual reality (VR) have been commercially available and widely used in the entertainment industry. Moreover, head mounted displays have been developed into types applicable to the fields of medicine, education, and other industries.

Augmented reality (AR) displays, an advanced form of VR displays, are image apparatuses combining the real world with VR and capable of bringing out interactions between reality and VR. The interaction between reality and VR is based on the function of providing information in real time about real situations, and the effect of reality is further increased by overlaying virtual objects or information on a real-world environment. Thus, AR displays may be used in various applications such as functional assistance in industry, realistic entertainment systems, education, and medical aids. For theses applications, it is important to guarantee apparatus reliability and wearability over a long period of time.

SUMMARY

Provided are an optical window system and a see-through type display apparatus including the optical window system.

Additional aspects will be set forth in part in the description which follows and, in part, will be apparent from the description, or may be learned by practice of the presented exemplary embodiments.

According to an aspect of an exemplary embodiment, there is provided an optical window system comprising: a path conversion member configured to change a path of light of a first image from a first direction to a second direction, the path conversion member being translucent to light incident in the second direction; and a focusing member configured to focus the light of the first image in the second direction, wherein the path conversion member is configured to occupy a space according to an angle, defined by a first length of the path conversion member in the first direction and a second length of the path conversion member in the second direction, satisfying a predetermined condition.

The angle defined by $\tan^{-1}$ (the second length/the first length) may be less than 45°.

The angle defined by $\tan^{-1}$ (the second length/the first length) may satisfy the following condition: 5° the angle 30°.

The focusing member may comprise a translucent concave mirror, and the path conversion member may be placed between the translucent concave mirror and an observer.

The path conversion member may comprise a first hologram optical element having a hologram pattern that is configured to change the light of the first image incident in the first direction to exit in the second direction.

The optical window system may further comprise a second hologram optical element placed between the path conversion member and the translucent concave mirror, the second hologram optical element may comprise a hologram pattern configured to scatter light incident in the second direction by a given width toward the translucent concave mirror.

The path conversion member may comprise a wedge-type prism comprising a plurality of wedged facets, wherein the wedged facets may be arranged in a third direction, which forms the angle with the first direction, and wherein one or more of the wedged facets may be inclined 45° with respect to the first direction.

The focusing member may further comprise a polarization-selective lens for light having a first polarization state and having substantially no refractive power for light having a second polarization state perpendicular to the first polarization state, and the polarization-selective lens is placed between the path conversion member and an observer.

The path conversion member may further comprise a hologram optical element having a hologram pattern that is configured to change the light of the first image incident in the first direction to exit in the second direction.

The optical window system may further comprise a polarizer having a polarization axis in a second polarization direction being placed on a first side of the hologram optical element opposite to a second side of the hologram optical element facing the polarization-selective lens.

The path conversion member may comprise a wedge-type prism comprising a plurality of wedged facets, wherein the wedged facets may be arranged in a third direction, which forms the angle with the first direction, and wherein one or more of the wedged facets may be inclined 45° with respect to the first direction.

The optical window system may further comprise a polarizer having a polarization axis in a second polarization direction being placed on a first side of the wedge-type prism opposite to a second side of the wedge-type prism facing the polarization-selective lens.

According to an aspect of another exemplary embodiment, there is provided a see-through type display apparatus comprising: an image forming system configured to form a first image in a first direction; a path conversion member configured to change a path of light of the first image to a second direction, the path conversion member being translucent to a second image, which is of a real environment, incident in the second direction; and a focusing member configured to focus the light of the first image in the second direction, wherein the path conversion member is configured to occupy a space according to an angle, defined by a first length of the path conversion member in the first direction and a second length of the path conversion member in the second direction, satisfying a predetermined condition, The angle defined by $\tan^{-1}$ (the second length/the first length) may be less than 45°.

The angle defined by $\tan^{-1}$ (the second length/the first length) may satisfy the following condition: 5° the angle 30°.

The focusing member may comprise a translucent concave mirror, and the path conversion member may be placed between the translucent concave mirror and an observer.

The path conversion member may comprise a first hologram optical element having a hologram pattern that is configured to change the light of the first image incident in the first direction to exit in the second direction toward the translucent concave mirror.

The see-through type display apparatus may further comprise a second hologram optical element placed between the path conversion member and the translucent concave mirror, the second hologram optical element comprising a hologram pattern configured to scatter light incident from the path conversion member by a given width toward the translucent concave mirror.

The path conversion member may comprise a wedge-type prism comprising a plurality of wedged facets, wherein the wedged facets may be arranged in a third direction, which forms the angle with the first direction, and wherein one or more of the wedged facets may be inclined 45° with respect to the first direction.

The wedge-type prism may comprise: a first prism comprising a plurality of wedged facets that are mirror-coated; and a second prism comprising a material having same refractive index as the first prism, the second prism sharing the plurality of wedged facets with the first prism.

The wedge-type prism may comprise: a first prism comprising a plurality of wedged facets; and a second prism comprising a material having same refractive index as the first prism, and comprising a plurality of total reflection facets parallel with the plurality of wedged facets, wherein the second prism is spaced apart from the first prism with an air gap being therebetween.

The see-through type display apparatus may further comprise a hologram optical element placed between the path conversion member and the translucent concave mirror, the hologram optical element comprising a hologram pattern configured to scatter light incident from the path conversion member by a given width toward the translucent concave mirror.

The focusing member may comprise a polarization-selective lens for light having a first polarization state and having substantially no refractive power for light having a second polarization state perpendicular to the first polarization state, and the polarization-selective lens may be placed between the path conversion member and an observer.

The polarization-selective lens may comprise: an optically anisotropic material portion having different refractive indexes with respect to light having the first polarization state and light having the second polarization state; and an optically isotropic material portion having same refractive index as the optically anisotropic material portion with respect to light having the second polarization state, wherein an interface between the optically anisotropic material portion and the optically isotropic material portion may be a lens surface.

The polarization-selective lens may comprise a meta lens comprising nanostructures having a sub-wavelength shape dimension.

The polarization-selective lens may comprise a geometric phase lens.

The path conversion member may comprise a hologram optical member, and the hologram optical member may comprise a hologram pattern configured to change the light of the first image incident in the first direction to exit in the second direction toward the polarization-selective lens.

The see-through type display apparatus may further comprise a polarizer having a polarization axis in a second polarization direction being placed on a first side of the hologram optical element opposite a second side of the hologram optical element facing the polarization-selective lens.

The path conversion member may comprise a wedge-type prism comprising a plurality of wedged facets, wherein the wedged facets may be arranged in a third direction, which forms the angle with the first direction, and wherein one or more of the wedged facets may be inclined 45° with respect to the first direction.

The wedge-type prism may comprise: a first prism comprising a plurality of wedged facets that are mirror-coated; and a second prism comprising a material having same refractive index as the first prism, the second prism sharing the plurality of wedged facets with the first prism.

The wedge-type prism may comprise: a first prism comprising a plurality of wedged facets; and a second prism comprising a material having same refractive index as the first prism, the second prism comprising a plurality of total reflection facets parallel with the plurality of wedged facets, the second prism being spaced apart from the first prism with an air gap being therebetween.

The see-through type display apparatus may further comprise a polarizer having a polarization axis in a second polarization direction being placed on a first side of the wedge-type prism opposite to a second side of the wedge-type prism facing the polarization-selective lens.

The see-through type display apparatus may be a head mounted display (HMD).

According to an aspect of another exemplary embodiment, there is provided an optical window system comprising: a path conversion member configured to change a path of light of a first image from a first direction to a second direction and configured to have a first length corresponding to the first direction and a second length corresponding to the second direction satisfying a predetermined condition; and a focusing member configured to focus the light of the first image in the second direction.

In the optical window system, a relationship between the first length and the second length may satisfy the predetermined condition.

The predetermined condition may be satisfied when a ratio of the second length and the first length is less than 1.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
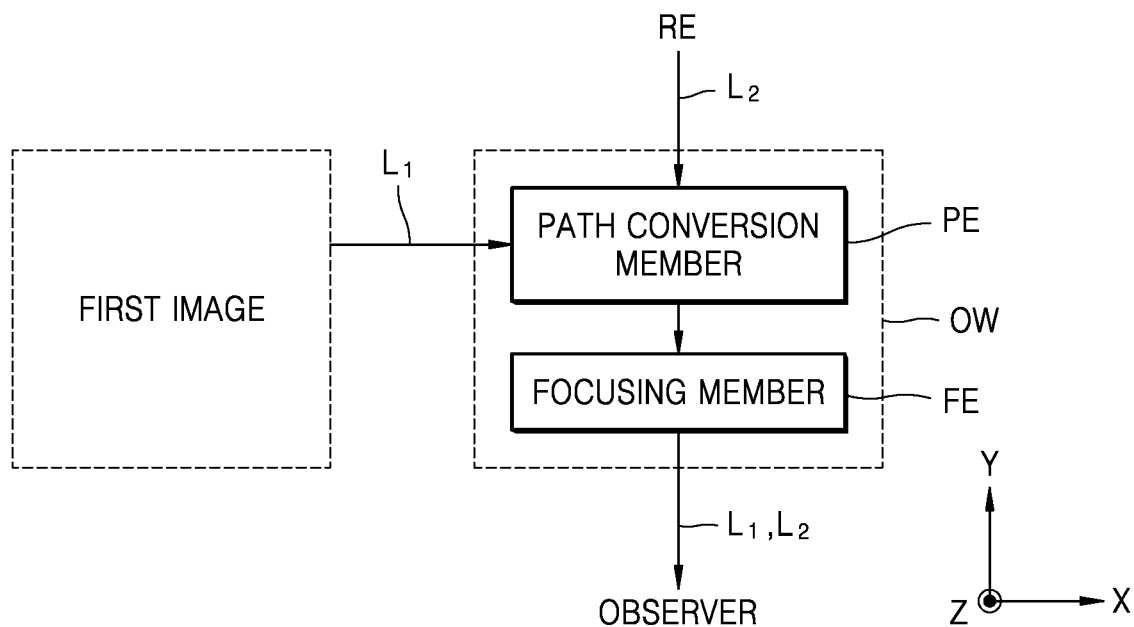
FIG. 1 is a conceptual view schematically illustrating a configuration of an optical window system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items.

Hereinafter, embodiments of the present disclosure will be described with reference to the accompanying drawings. In the drawings, like reference numerals refer to like elements, and the sizes of elements may be exaggerated for clarity of illustration. The exemplary embodiments described herein are for illustrative purposes only, and various modifications may be made therein.

In the following description, when an element is referred to as being "above" or "on" another element, it may be directly on the other element while making contact with the other element or may be above the other element without making contact with the other element.

As used herein, the singular forms "a," "an" and "the" are intended to include the plural forms as well, unless the context clearly indicates otherwise. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in appropriate order unless explicitly described in terms of order or described to the contrary. That is, operations are not limited to the order in which the operations are described. In the present disclosure, examples or exemplary terms (for example, "such as" and "etc.") are used for the purpose of description and are not intended to limit the scope of the present disclosure unless defined by the claims.

Figure 2A:
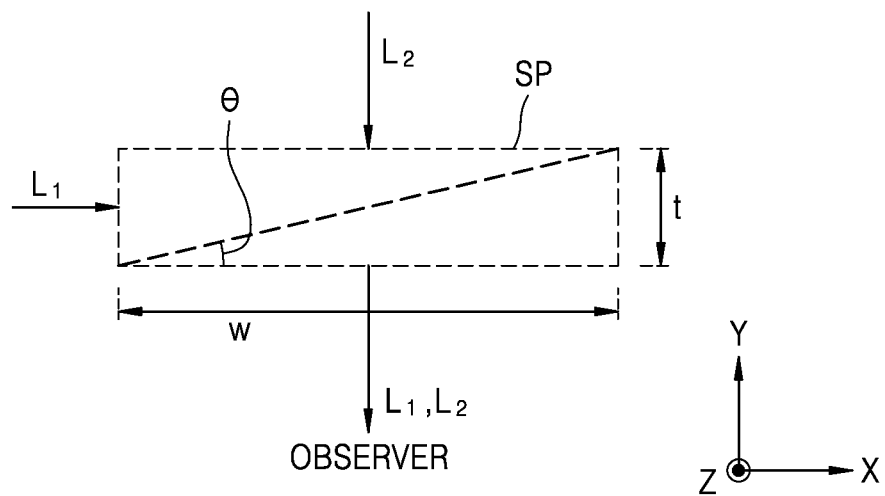
FIG. 2A is a conceptual view illustrating a field of view and the size of a space occupied by a path conversion member employed in the optical window system of FIG. 1 according to an exemplary embodiment.
Figure 2B:
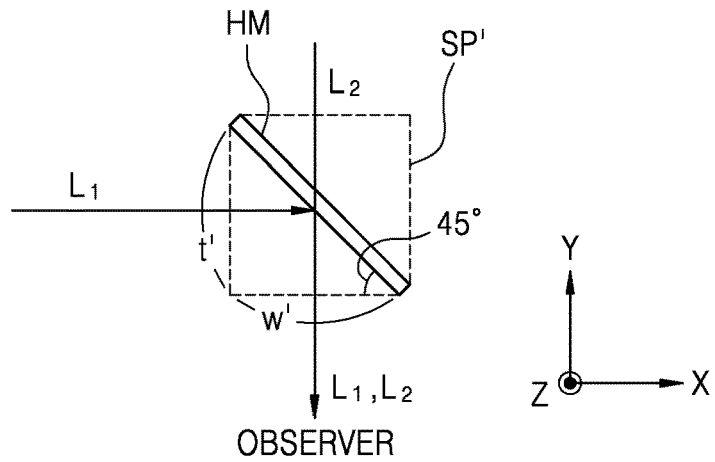
FIG. 2B is a conceptual view illustrating a field of view and the size of a space occupied by a path conversion member of a comparative example.

FIG. 1 is a conceptual view schematically illustrating a configuration of an optical window system OW according to an exemplary embodiment. FIG. 2A is a conceptual view illustrating a field of view and the size of a space SP occupied by a path conversion member PE employed in the optical window system OW of FIG. 1, and FIG. 2B is a conceptual view illustrating a field of view and the size of a space SP' occupied by a path conversion member of a comparative example.

Referring to FIG. 1, the optical window system OW is configured to transmit a first image to an observer after changing the path of the first image and to allow the observer to see a front environment, for example, a real environment or another image. Hereinafter, the front environment of the observer will be collectively referred to as a real environment RE. To this end, the optical window system OW includes: the path conversion member PE configured to change the path of the first image from a first direction to a second direction and being translucent to light incident in the second direction; and a focusing member FE configured to focus the first image at an observer position after the path of the first image is changed by the path conversion member PE. Thus, light $L_1$ of the first image and light $L_2$ incident from a front side of the observer, that is, light $L_2$ from the real environment RE may reach the observer position. For example, the first direction may be an X-axis direction. The position of the focusing member FE is illustrated as being between the observer and the path conversion member PE, but is not limited thereto. For example, the path conversion member PE may be placed between the observer and the focusing member FE. The second direction may be parallel with a Y-axis direction and may be a positive (+) or negative (−) Y-axis direction.

Referring to FIG. 2A, the space SP occupied by the path conversion member PE has a length W in the first direction and a length t in the second direction, and an angle θ defined by the lengths W and t satisfies the following condition:

$$\theta = \tan^{-1}(t/W) < 45° \quad (1)$$

This condition reduces the thickness of the optical window system OW as much as possible while increasing the field of view of the optical window system OW.

According to another exemplary embodiment, a path conversion member is configured to have a first length (W) corresponding to the first direction and a second length (t) corresponding to the second direction satisfying a predetermined condition. For example, the path conversion member is configured to occupy the space SP such that a relationship between length W in the first direction and the length tin the second direction satisfies a particular condition.

According to an exemplary embodiment, the relationship between length W in the first direction and the length t in the second direction is such that an angle θ defined by the lengths W and t satisfies the following condition:

$$\theta = \tan^{-1}(t/W) < 45°$$

According to another exemplary embodiment, the relationship between length W in the first direction and the length t in the second direction is such that a ratio an angle θ defined by the lengths W and t is less than 1.

In FIG. 2A, only the space SP necessary for placing the path conversion member PE is illustrated, and the path conversion member PE is not illustrated. Path conversion members PE having various shapes may be placed in the space SP. For example, the path conversion member PE may have the same rectangular cross-sectional shape as the space SP, a diagonally-divided triangular cross-sectional shape, or a diagonally-elongated tetragonal cross-sectional shape. The path conversion member PE expands the first image in the X-axis direction. That is, as the length W of the space SP measured in the first direction increases, the field of view at the observer position increases. In addition, the length t in the second direction increases accordingly. The length t in the second direction closely relates to the thickness of the optical window system OW. When the optical window system OW is positioned adjacent to an observer's eye, for example, when the optical window system OW is worn like glasses, wearing convenience decreases as the thickness of the optical window system OW increases.

As the angle θ decreases, the field of view of the optical window system OW increases, and the thickness of the optical window system OW reduces. However, since the path conversion member PE has a function of changing the path of the first image, it is practically impossible to set the angle θ to be zero.

In exemplary embodiments, the condition (1) is proposed to increase the field of view and reduce a system thickness by reducing the angle θ as much as possible. According to an exemplary embodiment, the angle θ may satisfy the following condition.

$$5° \leq \theta \leq 30° \quad (2)$$

Referring to FIG. 2B, a half mirror HM is illustrated as an example member that is configured to change the path of the first image to the second direction and is translucent to light incident in the second direction. The half mirror HM is inclined 45° with respect to the first direction.

The space SP' occupied by the half mirror HM has a length W' in the first direction and a length t' in the second direction that are equal to each other, resulting in a field of view narrower than the field of view in the above exemplary embodiment and a system thickness larger than the system thickness in the above embodiment.

Hereinafter, various types of optical window systems having a wide field of view and capable of reducing a system thickness will be described. Optical window systems of exemplary embodiments may be employed in see-through type display apparatuses, and thus will be described below as components of see-through type display apparatuses. However, the optical window systems are not limited to this application.

Figure 3:
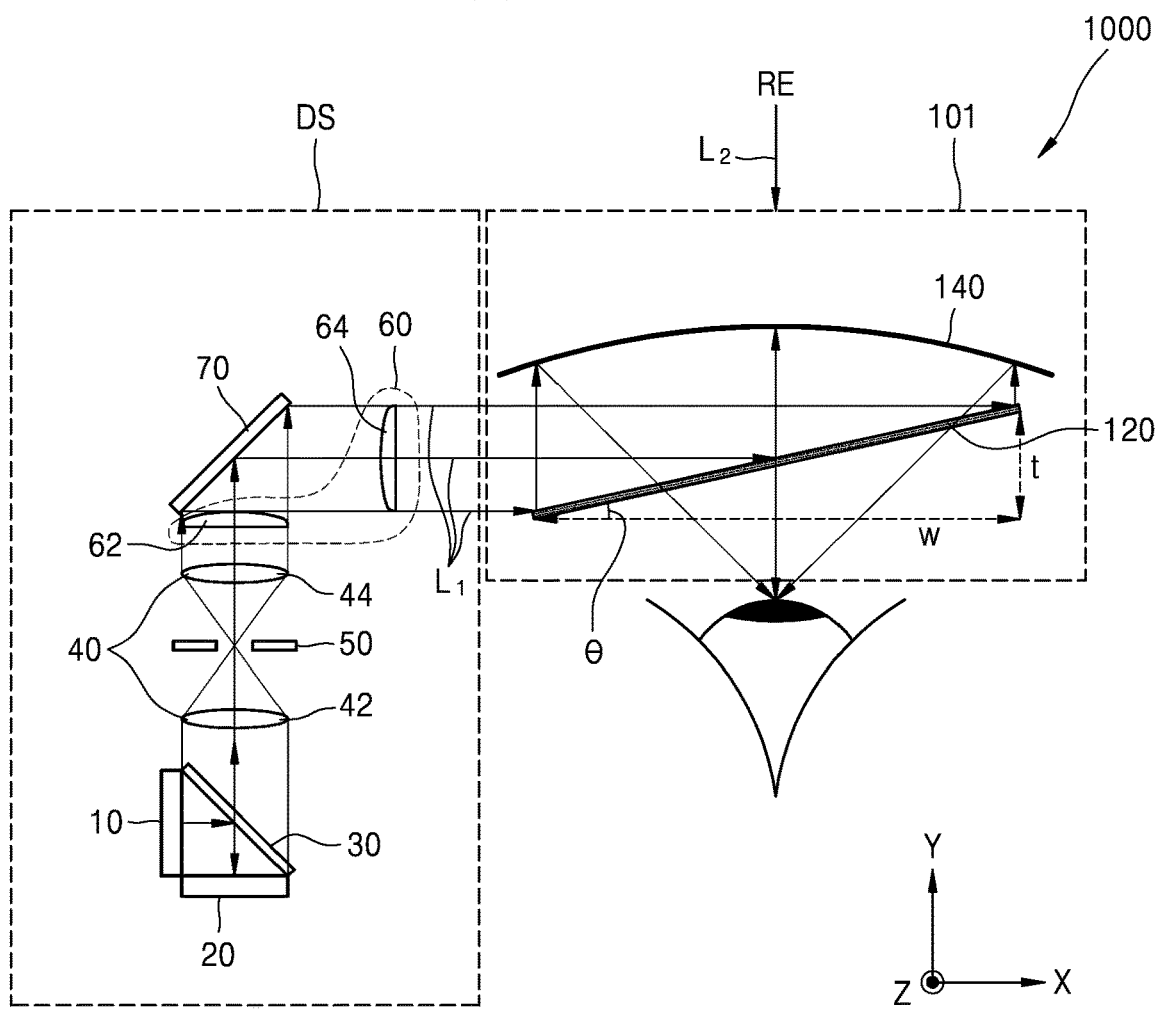
FIG. 3 is a view illustrating an optical arrangement in a see-through type display apparatus according to an exemplary embodiment.
Figure 4:
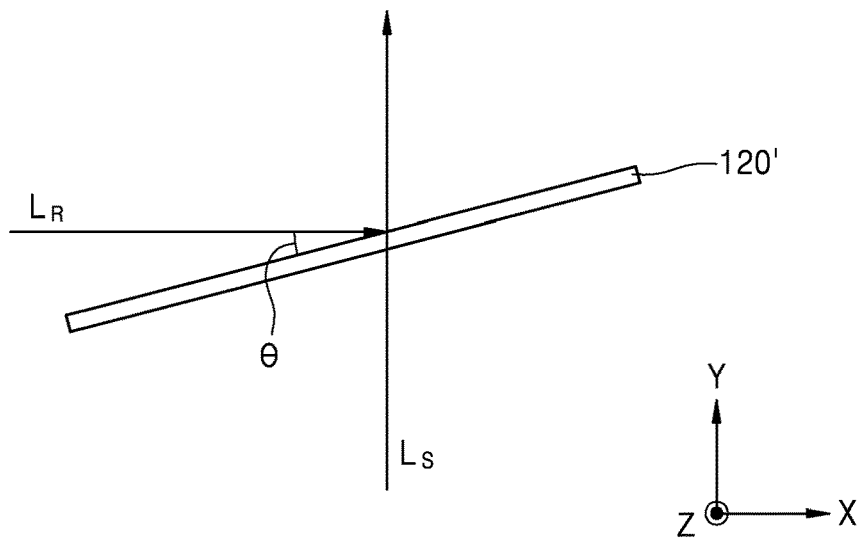
FIG. 4 is a conceptual view illustrating a method of forming a first hologram optical element employed in the see-through type display apparatus of FIG. 3 according to an exemplary embodiment.

FIG. 3 is a view illustrating an optical arrangement in a see-through type display apparatus 1000 according to an exemplary embodiment, and FIG. 4 is a conceptual view illustrating a method of forming a first hologram optical element 120 employed in the see-through type display apparatus 1000 of FIG. 3.

The see-through type display apparatus 1000 includes: an image forming system DS configured to form light $L_1$ of a first image in the first direction; and an optical window system 101 configured to change the path of the light $L_1$ of the first image to direct the light $L_1$ of the first image to an observer. In addition, the optical window system 101 is translucent to light incident from a front side of the observer and configured to provide a front-side real environment RE to the sight of the observer together with the first image.

The first image formed by the image forming system DS may be a two-dimensional image or a three-dimensional image, and the three-dimensional image may be a hologram image, a stereo image, a light field image, an integral photography (IP) image, or the like. In addition, the first image may include a multi-view image or a super multi-view image.

An example configuration of the image forming system DS will now be described. The configuration of the image forming system DS described below is an illustrative configuration, and the image forming system DS is not limited thereto.

The image forming system DS includes a light source 10, a display device 20 configured to form an image by modulating light emitted from the light source 10 according to image information, and an optical system configured to expand or reduce the image and transmit the image to a given position.

For example, the display device 20 may include a liquid crystal on silicon (LCoS) device, a liquid crystal display (LCD) device, an organic light emitting diode (OLED) display device, or a digital micromirror device (DMD). In addition, the display device 20 may include a next generation display device such as a micro light emitting diode (LED) display device or a quantum dot (QD) LED display device.

A beam splitter 30 may be provided between the light source 10 and the display device 20. The beam splitter 30 may reflect light emitted from the light source 10 to change the path of the light toward the display device 20 and may transmit the light after the light is modulated by the display device 20.

The light transmitted through the beam splitter 30 may be transmitted to a relay optical system. The relay optical system may include a pair of relay lenses 40 and a spatial filter 50.

The relay lenses 40 include two lenses 42 and 44, and the focal lengths of the two lenses 42 and 44 may be equal to each other or different from each other. An image formed by the display device 20 may be expanded or reduced depending on the ratio of the two focal lengths.

The spatial filter 50 may be located on or near a focal plane of the two lenses 42 and 44 of the relay lenses 40. The spatial filter 50 may have an aperture such as a pinhole. The spatial filter 50 may serve to remove noise from light passing through the lens 42.

Light passing through the relay optical system is expanded in the Y-axis direction and the X-axis direction while passing through a first cylinder lens 62 and a second cylinder lens 64. Although it is illustrated that a mirror member 70 is placed between the first cylinder lens 62 and the second cylinder lens 64, this is a non-limiting example. In another example, the position of the mirror member 70 and the position of the first cylinder lens 62 may be reversed.

The optical window system 101 includes: the first hologram optical element 120 configured to change the path of light $L_1$ of a first image formed by the image forming system DS so as to direct the light $L_1$ of the first image in the second direction (parallel with an Y-axis), the hologram optical element 120 being translucent to light $L_2$ of a real environment RE propagating in the second direction; and a translucent concave mirror 140 configured to focus the first image at the observer position after the path of the first image is changed by the first hologram optical element 120. An image formed by the image forming system DS may be directed to the translucent concave mirror 140 by the first hologram optical element 120 and may then be reflected and focused by the translucent concave mirror 140 onto the observer position.

An angle θ defined by lengths W and t in the first and second directions of a space occupied by the first hologram optical element 120 satisfies the following condition:

$$\theta = \tan^{-1}(t/W) < 45°$$

The angle θ may satisfy the following condition:

$$5° \leq \theta \leq 30°$$

The first hologram optical element 120 may be placed between the observer and the translucent concave mirror 140. The first hologram optical element 120 includes a hologram pattern such that light incident in the first direction may be directed toward the translucent concave mirror 140 in the second direction. The hologram pattern may be formed by interference between two coherent beams, for example, a signal beam and a reference beam.

Referring to FIG. 4, a hologram medium 120' is placed at an angle θ with the first direction, that is, the X-axis direction. Then, light is cast in the first direction, that is, the X-axis direction as a reference beam $L_R$, and light is cast in the second direction, that is, the Y-axis direction as a signal beam $L_S$. The hologram medium 120' may be a photosensitive medium including a material such as a photoresist or a photopolymer. Highly coherent laser beams may be used as the reference beam $L_R$ and the signal beam $L_S$. An optical interference pattern may be formed on the hologram medium 120' by the signal beam $L_S$ and the reference beam $L_R$ incident on the hologram medium 120' in the directions shown in FIG. 4, and thus the first hologram optical element 120 shown in FIG. 3 may be provided.

Light $L_1$ of a first image incident on the first hologram optical element 120 in the first direction is directed toward the translucent concave mirror 140 by the above-described interference pattern. The translucent concave mirror 140 focuses incident light at the observer position. The first hologram optical element 120 has the above-described path conversion function for only light incident in the first direction and is substantially translucent to light incident in other directions. That is, light $L_2$ of a real environment RE incident from a front side of the observer propagates without a change in path. Therefore, both the first image and the real environment RE ahead of the observer may be recognized by the observer.

Figure 5:
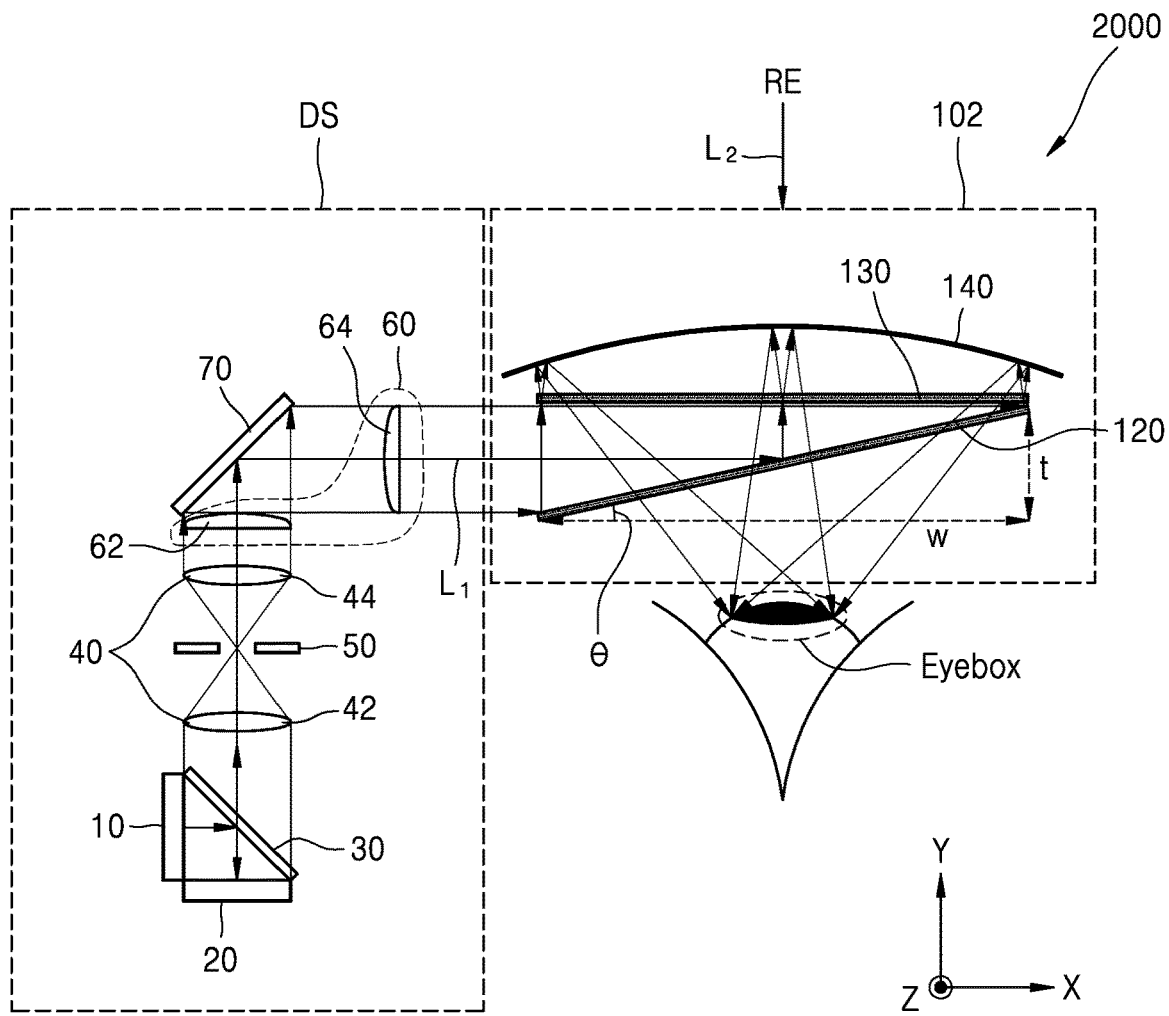
FIG. 5 is a view illustrating an optical arrangement in a see-through type display apparatus according to another exemplary embodiment.
Figure 6:
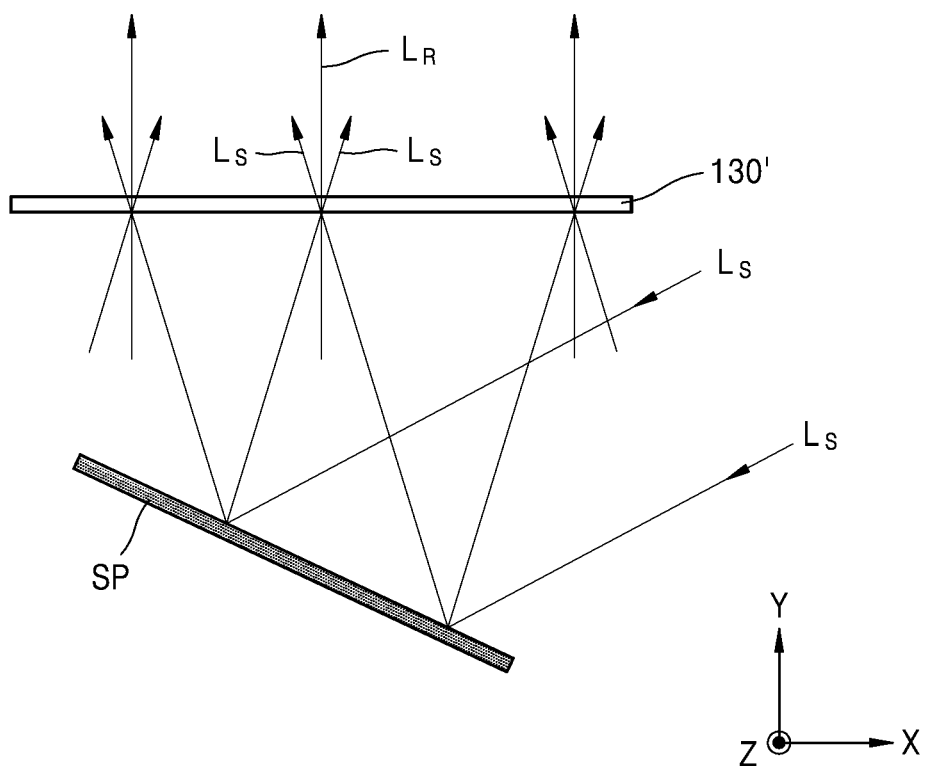
FIG. 6 is a conceptual view illustrating a method of forming a second hologram optical element employed in the see-through type display apparatus of FIG. 5 according to an exemplary embodiment.

FIG. 5 is a view illustrating an optical arrangement in a see-through type display apparatus 2000 according to another exemplary embodiment, and FIG. 6 is a conceptual view illustrating a method of forming a second hologram optical element 130 employed in the see-through type display apparatus 2000 of FIG. 6.

The see-through type display apparatus 2000 includes: a image forming system DS configured to form a first image in the first direction; and an optical window system 102 configured to focus light $L_1$ of the first image at an observer position by changing the path of the light $L_1$ of the first image, the optical window system 102 being translucent to light $L_2$ of a real environment RE.

The see-through type display apparatus 2000 is different from the see-through type display apparatus 1000 of FIG. 3 in that the optical window system 102 further includes the second hologram optical element 130.

In the optical window system 102 of the perspective display device 2000, the second hologram optical element 130 is further provided between a first hologram optical element 120 and a translucent concave mirror 140.

The second hologram optical element 130 has a hologram pattern such that light reaching the second hologram optical element 130 after the path of the light is changed by the first hologram optical device 120 may be scattered by a given width toward the translucent concave mirror 140. The hologram pattern may be formed by interference between two coherent beams, for example, a signal beam and a reference beam.

Referring to FIG. 6, after a hologram medium 130' is placed in parallel with the first direction, light is cast in the second direction as a reference beam $L_R$, and light scattering at an angle with respect to the second direction is cast as a signal beam $L_S$. The light scattering at an angle with respect to the second direction may be formed using a scatter plate SP. However, the present disclosure is not limited thereto. For example, a lens array may be used. The hologram medium 130' may be a photo-sensitive medium including a material such as a photoresist or a photopolymer. Highly coherent laser beams may be used as the reference beam $L_R$ and the signal beam $L_S$. An optical interference pattern may be formed on the hologram medium 130' by the signal beam $L_S$ and the reference beam $L_R$ incident on the hologram medium 130' in the directions shown in FIG. 6, and thus the second hologram optical element 130 shown in FIG. 5 may be formed.

Light $L_1$ of a first image incident on the second hologram optical element 130 in the second direction is directed toward the translucent concave mirror 140 while being scattered at an angle by the above-described interference pattern. The translucent concave mirror 140 focuses incident light at the observer position. At this time, the focusing position is a region having a certain size as illustrated in FIG. 5. That is, while maintaining the size of the optical window system 102, an eyebox through which observation of images is possible is widened.

Figure 7:
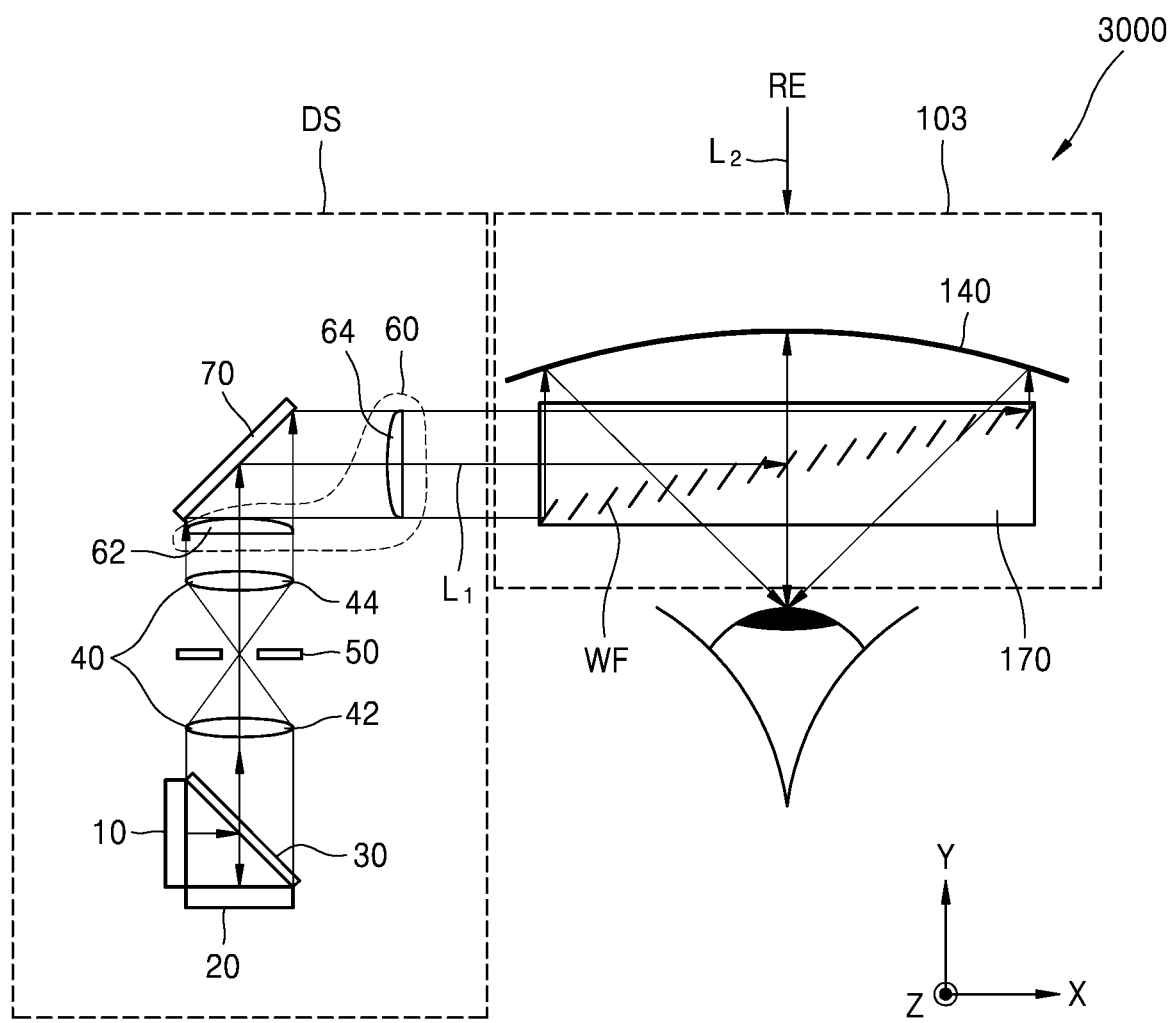
FIG. 7 is a view illustrating an optical arrangement in a see-through type display apparatus according to another exemplary embodiment.
Figure 8:
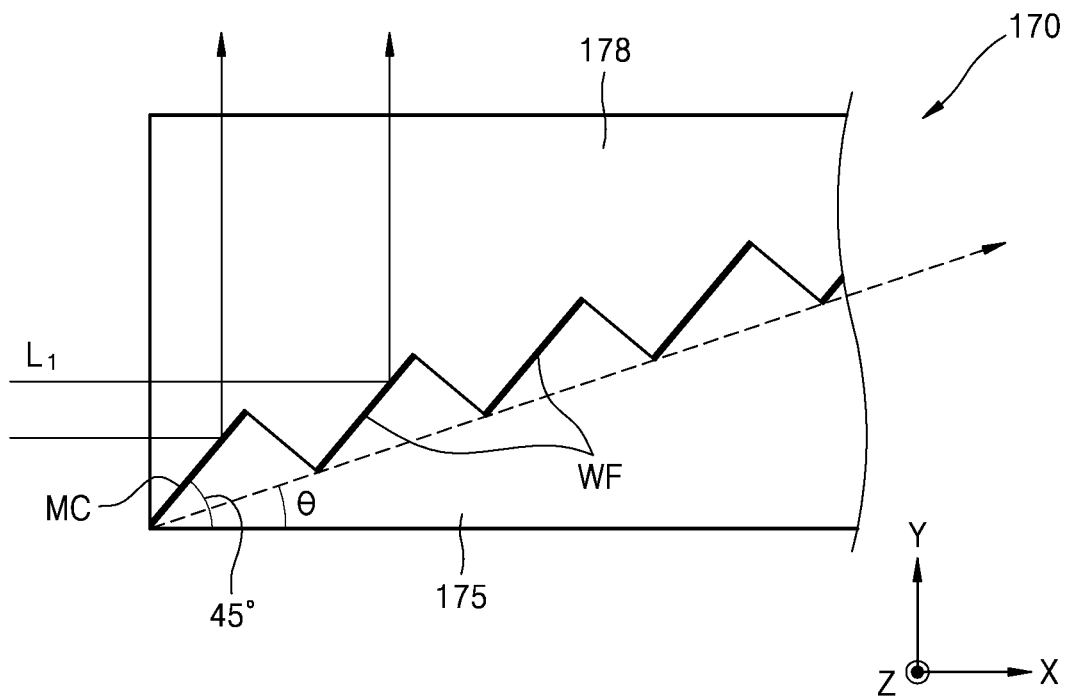
FIG. 8 is a partially enlarged view illustrating the shape of a wedge-type prism employed in the see-through type display apparatus of FIG. 7 according to another exemplary embodiment.

FIG. 7 is a view illustrating an optical arrangement in a see-through type display apparatus 3000 according to another exemplary embodiment, and FIG. 8 is a partially enlarged view illustrating the shape of a wedge-type prism 170 employed in the see-through type display apparatus 3000 of FIG. 7.

The see-through type display apparatus 3000 includes: a image forming system DS configured to form a first image in the first direction; and an optical window system 103 configured to focus light $L_1$ of the first image at an observer position by changing the path of the light $L_1$ of the first image, the optical window system 103 being translucent to light $L_2$ of a real environment RE.

The see-through type display apparatus 3000 differs from the see-through type display apparatus 1000 of FIG. 3 in that the optical window system 103 includes the wedge-type prism 170 as a path conversion member.

Referring to FIG. 8, the wedge-type prism 170 includes a plurality of wedged facets WF arranged in a direction making an angle θ with the first direction and inclined 45° with respect to the first direction. Each of the wedged facets WF is inclined 45° with respect to the first direction such that the direction of incident light may be changed by 90°, and since the wedged facets WF overlap each other when viewed in the first direction, a system thickness may be reduced. That is, a first-direction width and a second-direction length of a space occupied by the wedge-type prism 170 may be determined to adjust the angle θ to a desired value.

As illustrated in FIG. 8, the wedge-type prism 170 includes: a first prism 175 having the plurality of wedged facets WF and a mirror-coated film MC formed on the plurality of wedged facets WF; and a second prism 178 including a material having the same refractive index as the first prism 175 and sharing the plurality of wedged facets WF and the mirror-coated film MC with the first prism 175. Since the first prism 175 and the second prism 178 includes materials having the same refractive index, a portion of the wedge-type prism 170 in which the mirror-coated film MC is not formed has substantially no optical interface, and thus the wedge-type prism 170 may be translucent.

The wedge-type prism 170 of FIG. 8 may be provided without using a structure such as the second prism 178 by placing the first prism 175 in a structure in which a refractive index matching oil having the same refractive index as the first prism 175 is contained.

Figure 9:
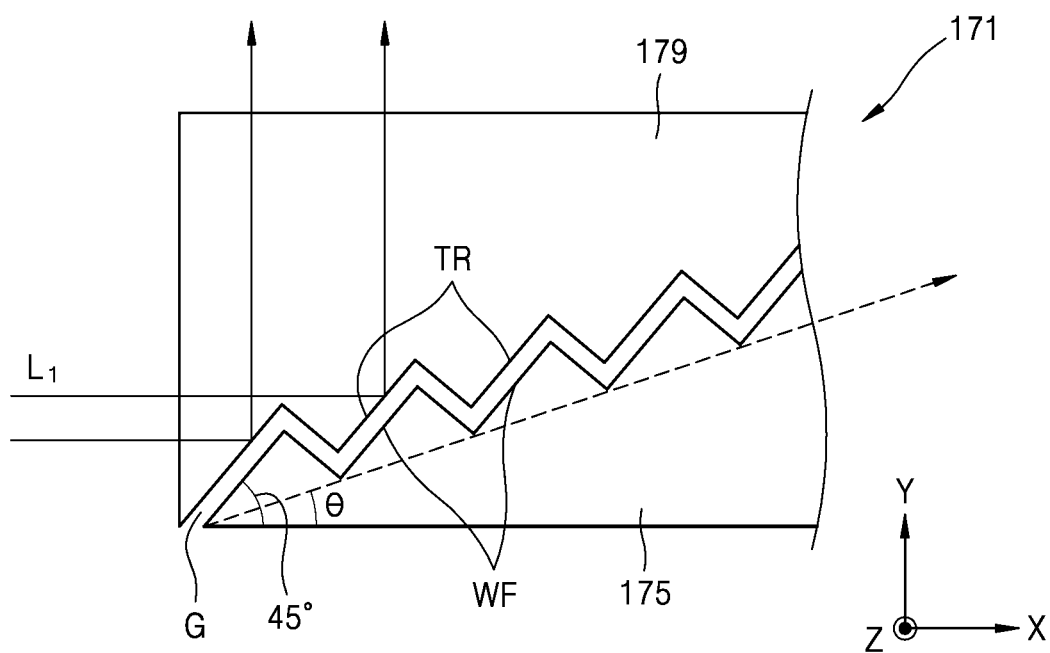
FIG. 9 is a partially enlarged view illustrating the shape of another wedge-type prism that may be employed in the see-through type display apparatus of FIG. 7 according to another exemplary embodiment.

FIG. 9 is a partially enlarged view illustrating the shape of another wedge-type prism 171 that may be employed in the see-through type display apparatus 3000 of FIG. 7.

Referring to FIG. 9, the wedge-type prism 171 includes: a first prism 175 having a plurality of wedged facets WF; and a second prism 179 including a material having the same refractive index as the first prism 175 and a plurality of total reflection facets TR parallel with the plurality of wedged facets WF, wherein the second prism 179 is spaced apart from the first prism 175 with an air gap G being formed therebetween.

Since the first prism 175 and the second prism 179 are spaced apart from each other, light $L_1$ of a first image propagating in the first direction may be totally reflected by the total reflection facets TR in the second direction. In addition, since the first prism 175 and the second prism 179 include materials having the same refractive index, and the wedged facets WF of the first prism 175 and the total reflection facets TR of the second prism 179 are parallel to each other, the wedge-type prism 171 may be made to be translucent by sufficiently reducing the air gap G.

Figure 10:
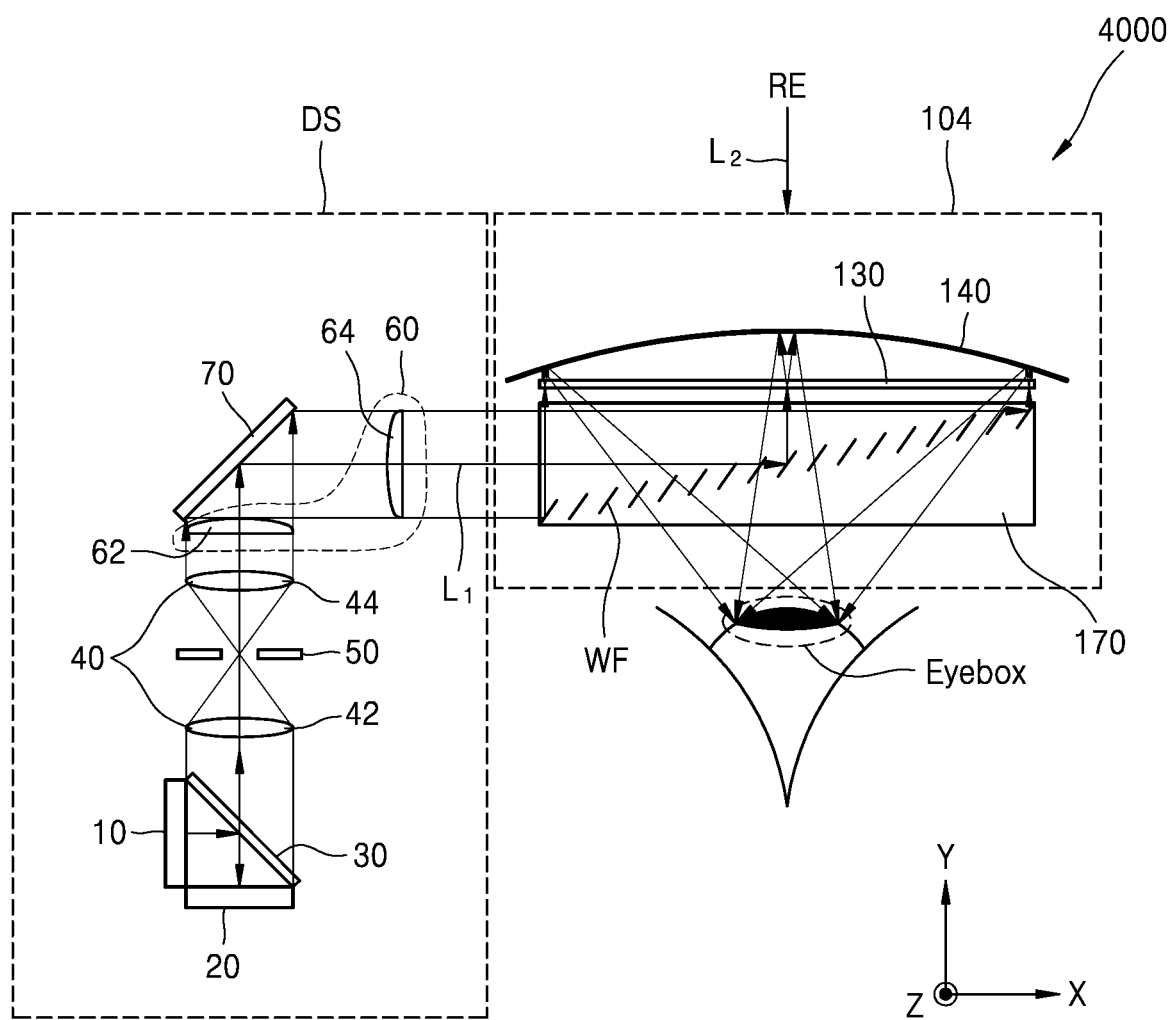
FIG. 10 is a view illustrating an optical arrangement in a see-through type display apparatus according to another exemplary embodiment.

FIG. 10 is a view illustrating an optical arrangement in a see-through type display apparatus 4000 according to another exemplary embodiment.

The see-through type display apparatus 4000 differs from the see-through type display apparatus 3000 of FIG. 7 in that an optical window system 104 further includes a hologram optical element 130.

The see-through type display apparatus 4000 includes: a image forming system DS configured to form a first image in the first direction; and an optical window system 104 configured to focus light $L_1$ of the first image at an observer position by changing the path of the light $L_1$ of the first image, the optical window system 104 being translucent to light $L_2$ of a real environment RE.

The optical window system 104 includes a wedge-type prism 170, a translucent concave mirror 140, and a hologram optical element 130. The hologram optical element 130 is placed between the wedge-type prism 170 and the translucent concave mirror 140. The hologram optical element 130 has a hologram pattern that scatters light incident from the wedge-type prism 170 by a given width toward the translucent concave mirror 140.

The hologram optical element 130 is substantially the same as the second hologram optical element 130 described with reference to FIG. 5.

If light $L_1$ of a first image is incident on the hologram element 130 in the second direction after the path of the light $L_1$ of the light $L_1$ of the first image is changed by the wedge-type prism 170, the light $L_1$ of the first image is directed to the translucent concave mirror 140 while being scattered at an angle by an interference pattern of the wedge-type prism 170. The translucent concave mirror 140 focuses incident light at the observer position. At this time, the focusing position is a region having a certain size as illustrated in FIG. 10. That is, while maintaining the size of the optical window system 104, an eyebox through which observation of images is possible is widened.

Figure 11:
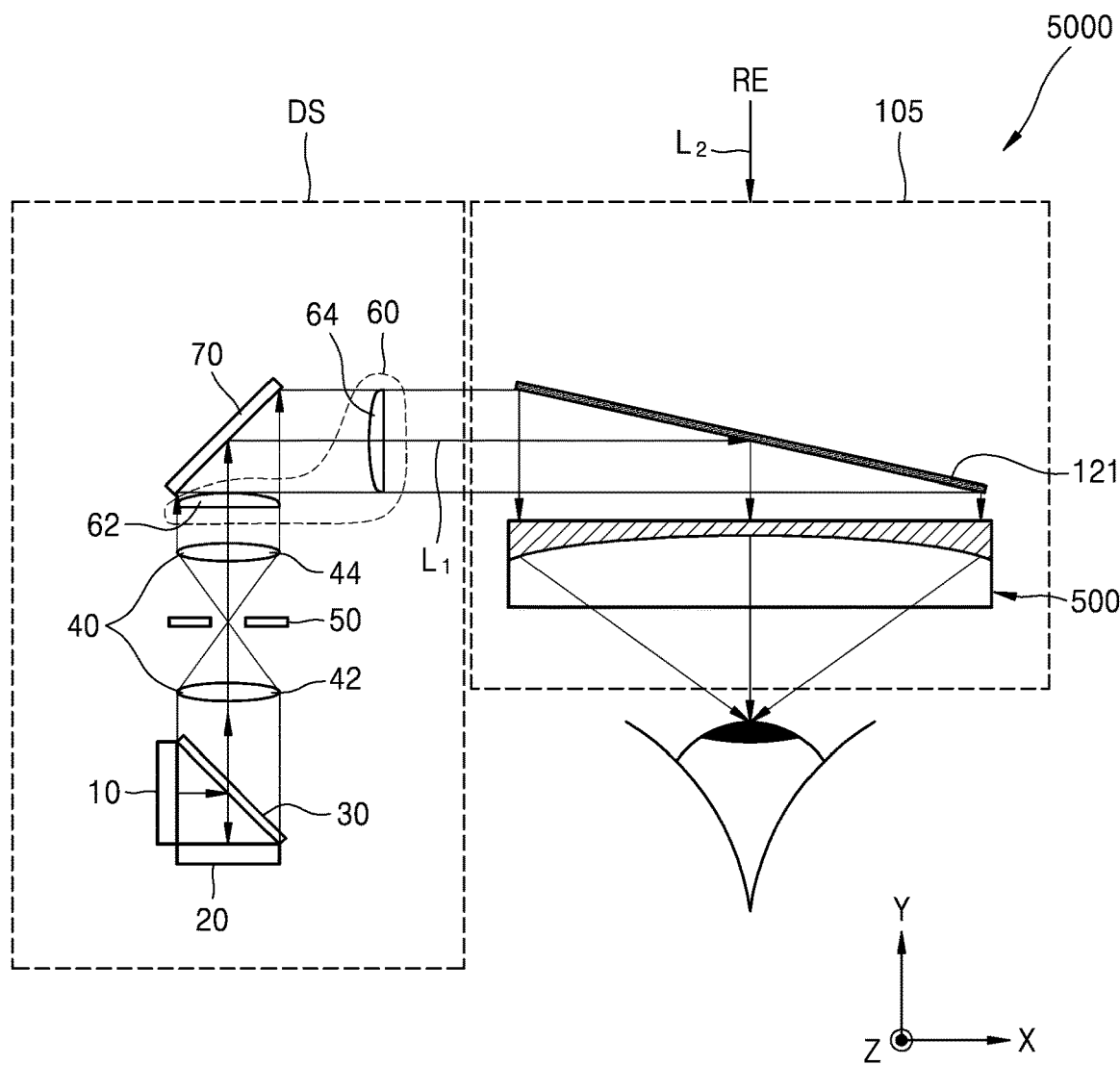
FIG. 11 is a view illustrating an optical arrangement in a see-through type display apparatus according to another exemplary embodiment.
Figure 12:
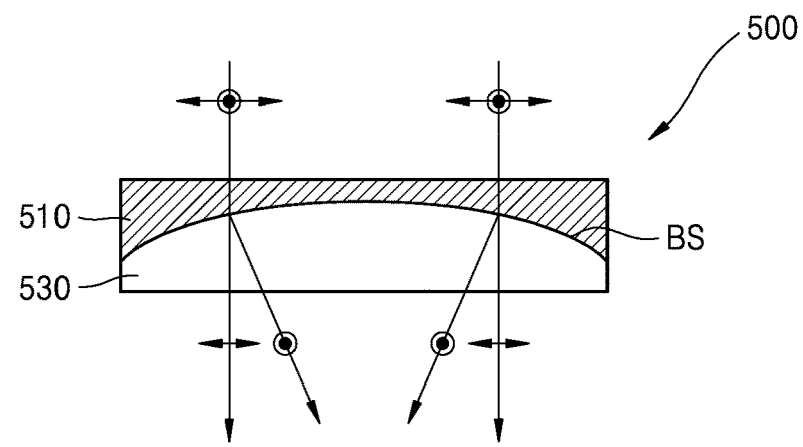
FIG. 12 is a view illustrating a configuration of a polarization-selective lens employed in the see-through type display apparatus of FIG. 11 according to an exemplary embodiment.

FIG. 11 is a view illustrating an optical arrangement in a see-through type display apparatus 5000 according to another exemplary embodiment, and FIG. 12 is a view illustrating a configuration of a polarization-selective lens 500 employed in the see-through type display apparatus 5000 of FIG. 11.

The see-through type display apparatus 5000 includes: an image forming system DS configured to form a first image in the first direction; and an optical window system 105 configured to focus light $L_1$ of the first image at an observer position by changing the path of the light $L_1$ of the first image, the optical window system 105 being translucent to light $L_2$ of a real environment RE.

The see-through type display apparatus 5000 is different from the above-described see-through type display apparatus 1000 in that the optical window system 105 includes the polarization-selective lens 500 as a focusing member.

The polarization-selective lens 500 may be placed between a first hologram optical element 121 and an observer. The polarization-selective lens 500 functions as a lens for light having a first polarization state and has substantially no refractive power for light having a second polarization state perpendicular to the first polarization state. Therefore, among light incident on the polarization-selective lens 500, light having the first polarization state is refracted, and light having the second polarization state is transmitted through the polarization-selective lens 500 without refraction. Light beams having different polarization states and incident on the polarization-selective lens 500 in different directions may propagate in the same path, and in this aspect, the polarization-selective lens 500 may operate as an optical combiner.

Referring to FIG. 12, the polarization-selective lens 500 includes: an optically anisotropic material portion 530 having different refractive indexes with respect to light having the first polarization state and light having the second polarization state; and an optically isotropic material portion 510 having the same refractive index that the optically anisotropic material portion 530 has with respect to light having the second polarization state. For example, the optically anisotropic material portion 530 may have a refractive index $n_e$ with respect to light having the first polarization state and a refractive index $n_o$ with respect to light having the second polarization state. For example, the first polarization state may be an S-polarized state indicated by the symbol ⊙, and the second polarization state may be a P-polarized state indicated by the symbol ↔. The optically isotropic material portion 510 has the same refractive index with respect to light having the first polarization state and light having the second polarization state, and the refractive index of the optically isotropic material portion 510 may be $n_o$.

An interface BS between the optically anisotropic material portion 530 and the optically isotropic material portion 510 is a lens surface. For example, as shown in FIG. 12, the lens surface may have a convex lens shape capable of focusing incident light toward the observer.

Therefore, if light having various polarization states is incident on the polarization-selective lens 500, separation of two polarization components occurs at the interface BS between the optically anisotropic material portion 530 and the optically isotropic material portion 510. That is, with respect to light having the first polarization state, the interface BS functions as an optical interface between materials having different refractive indexes. Thus, light having the first polarization state penetrates the interface BS while being refracted according to the shape of the interface BS. With respect to light having the second polarization state, the optically anisotropic material portion 530 and the optically isotropic material portion 510 are substantially the same material, that is, have substantially no optical interface therebetween. Therefore, light having the second polarization state penetrates the interface BS along the same path as the incident path thereof.

Thus, if light $L_1$ of a first image propagating in the first direction is S-polarized light, the polarization-selective lens 500 may function as a lens focusing the light $L_1$ of the first image at the observer position.

Figure 13:
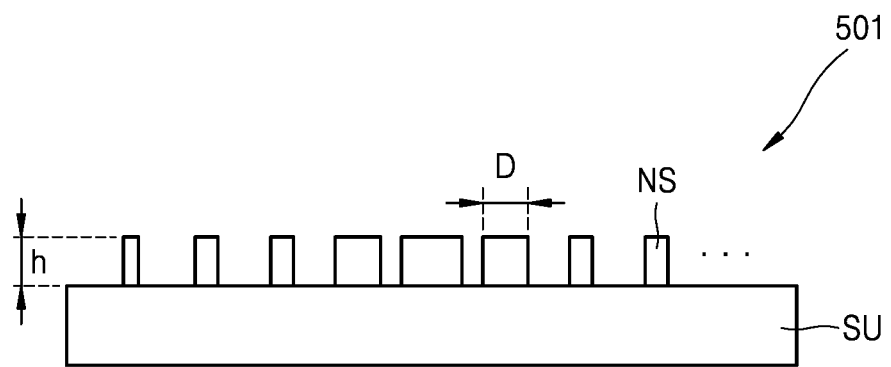
FIG. 13 is a view illustrating another polarization-selective lens that may be employed in the see-through type display apparatus of FIG. 11 according to an exemplary embodiment.

FIG. 13 illustrates another polarization-selective lens 501 that may be employed in the see-through type display apparatus 5000 of FIG. 11.

The polarization-selective lens 501 may be a meta lens including nanostructures NS having a sub-wavelength shape dimension. The sub-wavelength shape dimension means that a dimension such as a height (h) or a cross-sectional length D defining the shape of the nanostructures NS is smaller than the wavelength of incident light.

The nanostructures NS may be arranged to form a shape dimension distribution capable of varying the phase of incident light in a position-dependent manner, thereby imparting desired optical performance to the meta lens. The sizes of the nanostructures NS may be determined according to positions such that the meta lens may function as a convex lens. For example, if the nanostructures NS are arranged in such a manner that the cross-sectional lengths D of the nanostructures NS decrease in outward radial directions, the metal lens may function as a convex lens. In this case, if the nanostructures NS have shape anisotropy, the meta lens may function as a convex lens with respect to light having a particular polarization state.

The case of using an optically anisotropic material and an optically isotropic material, and the meta lens including nanostructures having shape anisotropy are illustrated as examples of polarization-selective lenses 500 and 501. However, the present disclosure is not limited thereto.

In addition, a geometric phase lens may be used as a polarization-selective lens. The geometric phase lens is a lens capable of geometrical phase modulation and may be configured to function as various optical systems by adjusting the orientation of liquid crystals. For example, the geometric phase lens may operate as different optical systems according to the polarization of light.

Figure 14A:
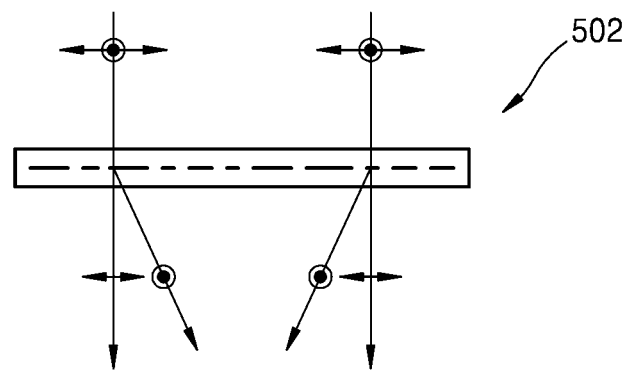
FIGS. 14A and 14B are a cross-sectional view and a plan view illustrating another example of a polarization-selective lens that may be employed in a see-through type display apparatus according to an exemplary embodiment.
Figure 14B:
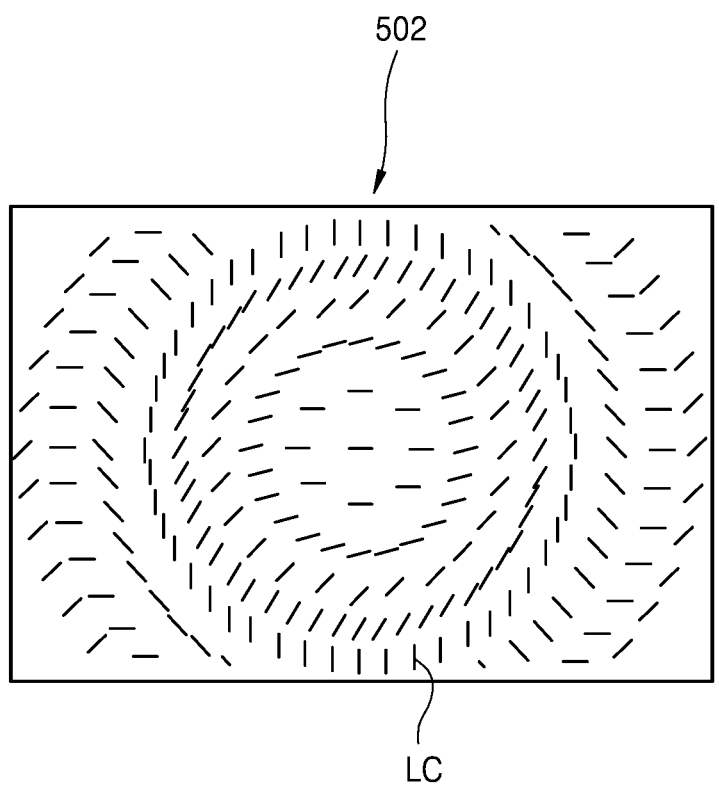

FIGS. 14A and 14B are a cross-sectional view and a plan view illustrating another example of a polarization-selective lens that may be employed in a see-through type display apparatus.

Referring to FIGS. 14A and 14B, a polarization-selective lens 502 may be a geometric phase lens including a plurality of nonlinear material elements forming a pattern. The nonlinear material elements may be implemented using liquid crystal molecules LC. The polarization-selective lens 502 may be formed by arranging liquid crystal molecules on a thin glass plate. The plan view of FIG. 14B illustrates an example pattern in which the directors of the liquid crystal molecules LC are two-dimensionally oriented in various directions. However, the present disclosure is not limited the illustrated pattern.

Desired optical performance may be obtained by adjusting the orientation of the liquid crystal molecules LC, that is, the arrangement of the directors of the liquid crystal molecules LC. For example, as shown in FIG. 14A, the function of a polarization-selective lens may be obtained by adjusting the arrangement pattern of the liquid crystal molecules LC in such a manner that the liquid crystal molecules LC operate as a lens with respect to light having a first polarization state (⊙) and have no refractive power with respect to light having a second polarization state (↔).

Figure 15:
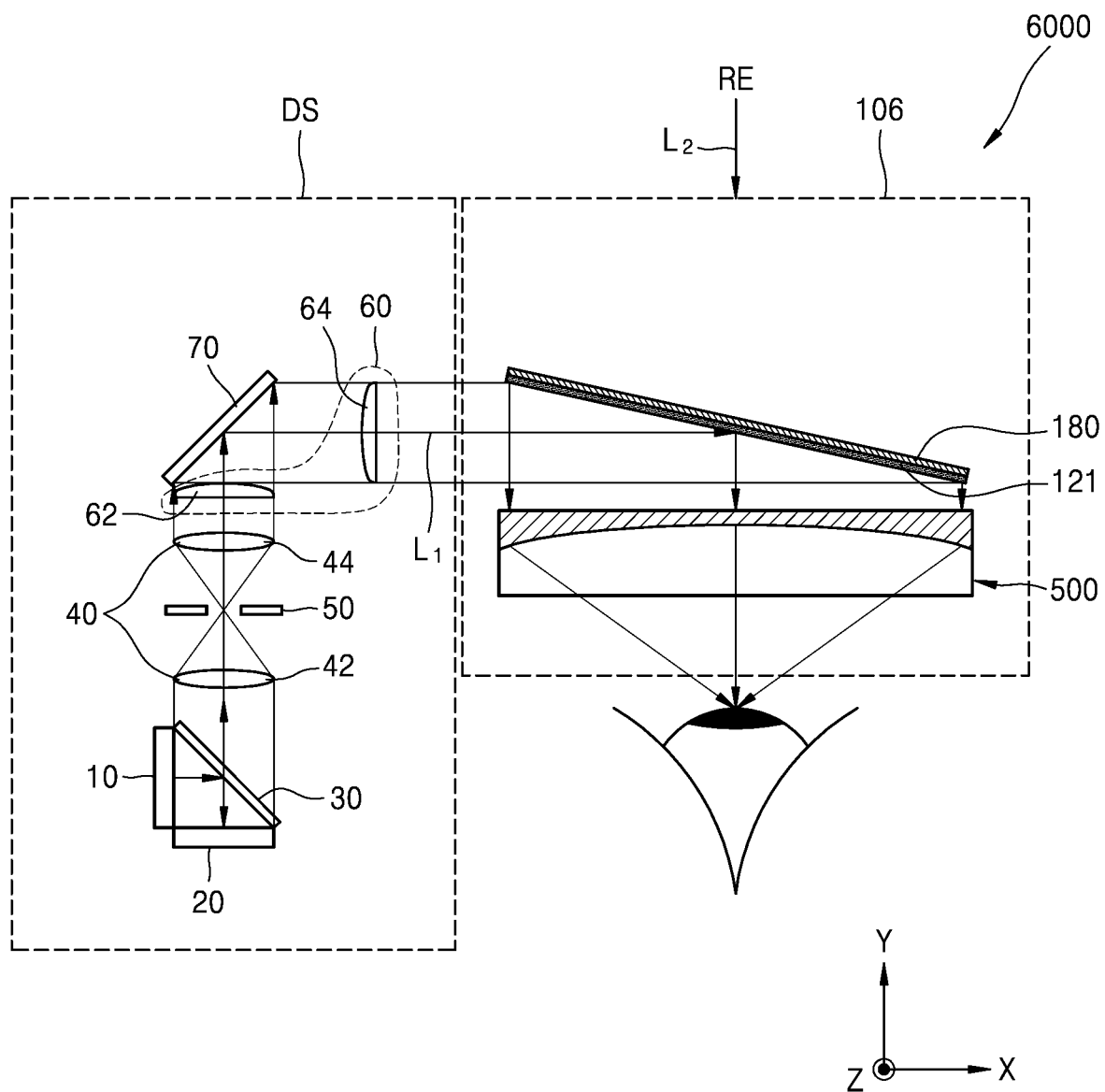
FIG. 15 is a view illustrating an optical arrangement in a see-through type display apparatus according to another exemplary embodiment.

FIG. 15 is a view illustrating an optical arrangement in a see-through type display apparatus 6000 according to another exemplary embodiment.

The see-through type display apparatus 6000 includes: a image forming system DS configured to form a first image in the first direction; and an optical window system 106 configured to focus light $L_1$ of the first image at an observer position by changing the path of the light $L_1$ of the first image, the optical window system 106 being translucent to light $L_2$ of a real environment RE.

The see-through type display apparatus 6000 is different from the see-through type display apparatus 5000 of FIG. 11 in that the optical window system 106 further includes a polarizer 180.

The polarizer 180 has a polarization axis in a second polarization direction. That is, the polarizer 185 transmits only a second polarization component of light $L_2$ coming from a real environment RE. Among two sides of a hologram optical element 121, the polarizer 180 may be placed on a side opposite a side facing a polarization-selective lens 500. In FIG. 15, the polarizer 180 is illustrated as being attached to a side of the hologram optical element 121. However, the polarizer 180 is not limited thereto. That is, the polarizer 180 may be placed at any position between the hologram optical element 121 and the real environment RE according to another exemplary embodiment.

The polarizer 180 is used in order to operate the polarization-selective lens 500 as a lens only for the light $L_1$ of the first image. Therefore, the light $L_2$ of the real environment RE not requiring a lens function is converted into light having a second polarization state by the polarizer 180, thereby intactly passing through the polarization-selective lens 500.

In addition, another polarizer having a polarization axis in a first polarization direction may be placed on an entrance side of the optical window system 106 on which the light $L_1$ of the first image is incident, so as to convert the light $L_1$ of the first image into light having a first polarization state.

Figure 16:
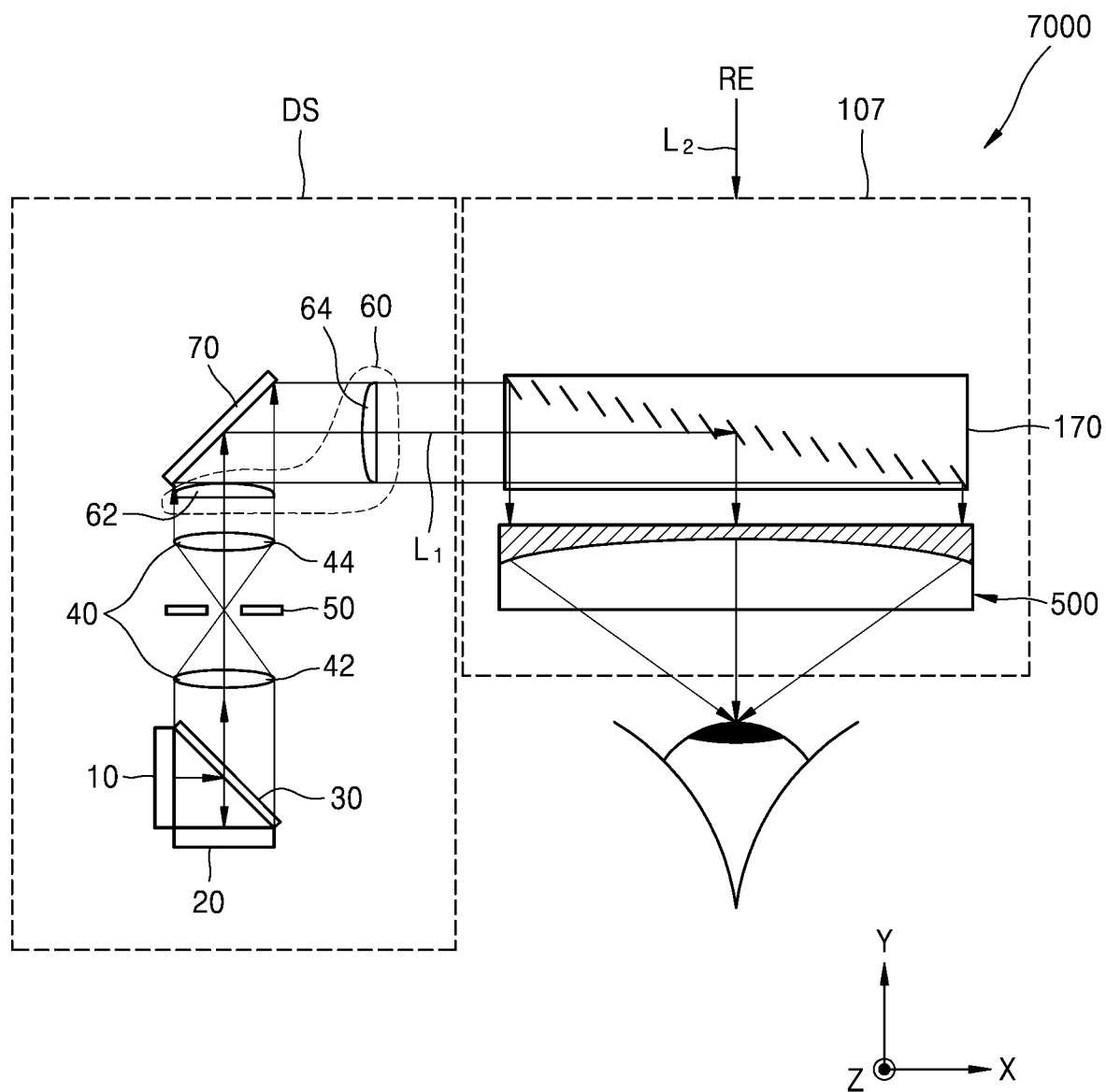
FIG. 16 is a view illustrating an optical arrangement in a see-through type display apparatus according to another exemplary embodiment.

FIG. 16 is a view illustrating an optical arrangement in a see-through type display apparatus 7000 according to another exemplary embodiment.

The see-through type display apparatus 7000 includes: a image forming system DS configured to form a first image in the first direction; and an optical window system 107 configured to focus light $L_1$ of the first image at an observer position by changing the path of the light $L_1$ of the first image, the optical window system 107 being translucent to light $L_2$ of a real environment RE.

The see-through type display apparatus 7000 is different from the see-through type display apparatus 3000 of FIG. 7 in that the optical window system 107 includes a polarization-selective lens 500 as a focusing member.

The light $L_1$ of the first image formed by the image forming system DS in the first direction is changed by a wedge-type prism 170 such that the light $L_1$ of the first image may propagate in the second direction, and then the light $L_1$ of the first image is focused at the observer position by the polarization-selective lens 500.

The Light $L_2$ of the real environment RE propagating in the second direction intactly passes through the wedge-type prism 170 having translucency and the polarization-selective lens 500, and then an observer may perceive the light $L_2$ of the real environment RE.

Any one of the wedge-type prisms 170 and 171 described with reference to FIGS. 8 and 9 may be used here as the wedge-type prism 170.

Figure 17:
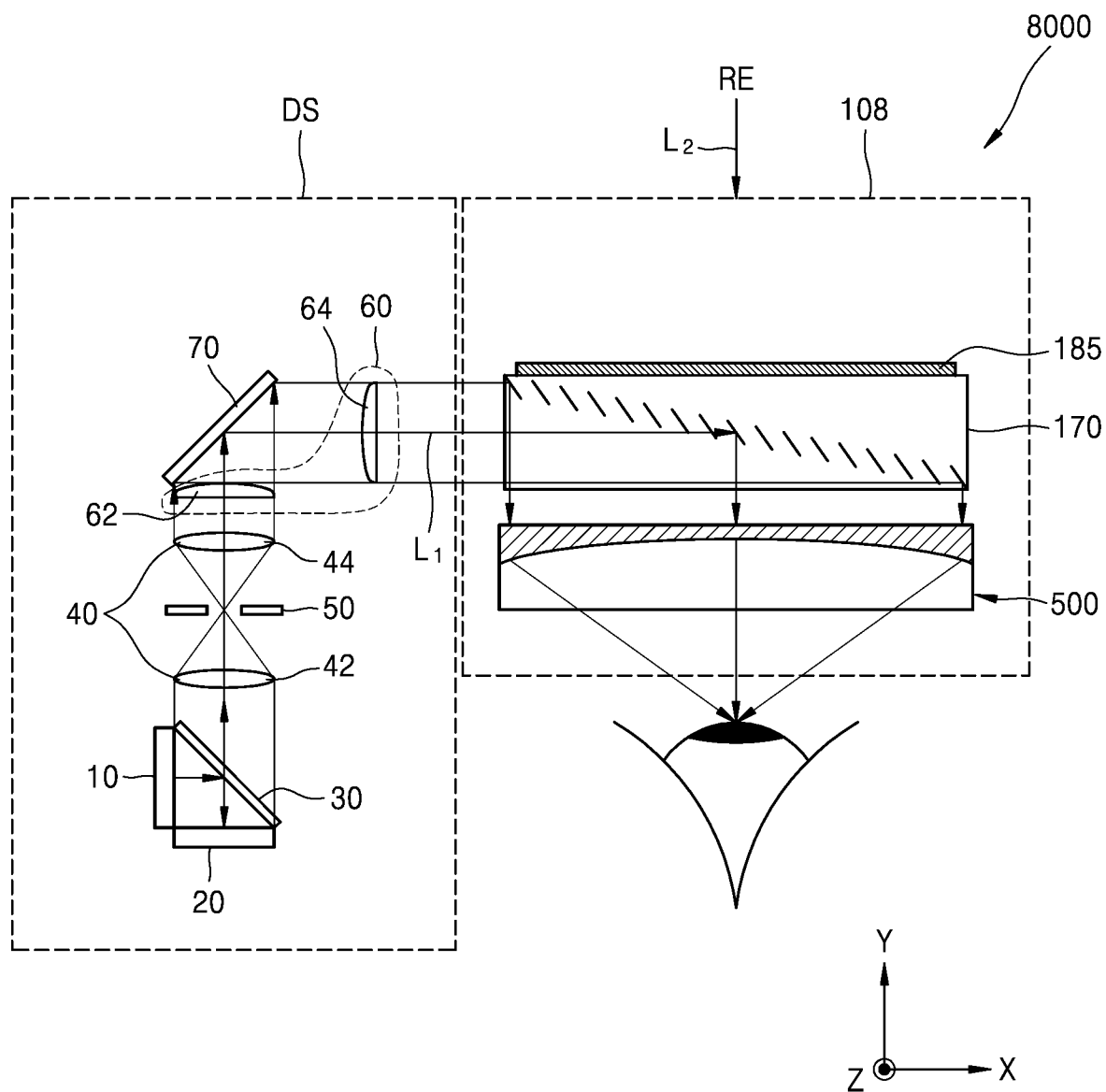
FIG. 17 is a view illustrating an optical arrangement in a see-through type display apparatus according to another exemplary embodiment.

FIG. 17 is a view illustrating an optical arrangement in a see-through type display apparatus 8000 according to another exemplary embodiment.

The see-through type display apparatus 8000 includes: a image forming system DS configured to form a first image in the first direction; and an optical window system 108 configured to focus light $L_1$ of the first image at an observer position by changing the path of the light $L_1$ of the first image, the optical window system 108 being translucent to light $L_2$ of a real environment RE.

The see-through type display apparatus 8000 is different from the see-through type display apparatus 7000 of FIG. 15 in that the optical window system 108 further includes a polarizer 185.

The polarizer 185 has a polarization axis in a second polarization direction. That is, the polarizer 185 transmits only a second polarization component of the light $L_2$ coming from the real environment RE. Among two sides of a wedge-type prism 170, the polarizer 185 may be placed on a side opposite a side facing a polarization-selective lens 500. In FIG. 17, the polarizer 185 is illustrated as being attached to a side of the wedge-type prism 170. However, the polarizer 185 is not limited thereto. That is, the polarizer 185 may be placed at any position between the wedge-type prism 170 and the real environment RE.

The polarizer 185 is used in order to operate the polarization-selective lens 500 as a lens only for the light $L_1$ of the first image. Therefore, the light $L_2$ of the real environment RE not requiring a lens function is converted into light having a second polarization state by the polarizer 185, thereby intactly passing through the polarization-selective lens 500.

In addition, another polarizer having a polarization axis in a first polarization direction may be placed on an entrance side of the optical window system 108 on which the light $L_1$ of the first image is incident, so as to convert the light $L_1$ of the first image into light having a first polarization state.

The above-described see-through type display apparatuses are configured to provide images formed by an image forming system to observers together with images of the real world and may thus be used for implementing augmented reality (AR).

Display apparatuses with AR may increase the effect of reality by displaying a real-world environment with virtual objects or information thereon. For example, additional information about a real-world environment may be formed by an image forming system at an observer position and may be provided to an observer. AR displays may be applied to ubiquitous environments or internet of things (IoT) environments.

Images of the real world are not limited to images of a real environment RE. For example, images of the real world may be images provided by other image apparatuses. Therefore, the above-described see-through type display apparatuses may be used as multi-image display apparatuses capable of displaying two images together.

The above-described see-through type display apparatuses may be provided in a wearable form. All or some of the components of the see-through type display apparatuses may be configured to be wearable.

For example, the see-through type display apparatuses may be applied in the form of a head mounted display (HMD). In addition, the see-through type display apparatuses may be applied in the form of a glasses-type display or a goggle-type display.

The see-through type display apparatuses may interact with or operate in connect with other electronic devices such as smartphones. For example, a controller for driving a see-through type display apparatus may be included in a smartphone. In addition, such a see-through type display apparatus as described above may be included in a smartphone, and the smartphone may be used as a see-through type display apparatus.

The above-described optical window systems may have a thin thickness but may provide a relatively wide field of view.

The optical window systems may perform path conversion on images coming through some paths and may transmit images coming through other paths. Therefore, the optical window systems may be applied to various display apparatuses.

The see-through type display apparatuses employing the optical window systems may have a thin thickness and provide a wide field of view. Therefore, the see-through type display apparatuses may be used as wearable apparatuses having high wearability.

Exemplary embodiments have been described and illustrated in the accompanying drawings to help understanding of the present disclosure. However, these exemplary embodiments are merely examples not limiting the scope of the present disclosure. In addition, it will be understood that the present disclosure is not limited to those illustrated and described herein. That is, those of ordinary skill in the art may make various modifications therein.

It should be understood that exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An optical window system comprising:
a path conversion member configured to change a path of light of a first image from a first direction to a second direction, the path conversion member being translucent to light incident in the second direction; and
a focusing member configured to focus the light of the first image in the second direction,
wherein the path conversion member is configured to occupy a space extending from a first side of the focusing member to a second side of the focusing member opposite to the first side defined by a first length of the path conversion member in the first direction and a second length of the path conversion member in the second direction, and
wherein an angle defined by tan−1 (the second length/the first length) is less than 45° across the entire space.

2. The optical window system of claim 1, wherein the angle defined by tan-1 (the second length/the first length) satisfies the following condition:

5°≤the angle≤30°.

3. The optical window system of claim 1, wherein the focusing member comprises a translucent concave mirror, and
the path conversion member is placed between the translucent concave mirror and an observer.

4. The optical window system of claim 3, wherein the path conversion member comprises a first hologram optical element having a hologram pattern that is configured to change the light of the first image incident in the first direction to exit in the second direction.

5. The optical window system of claim 4, further comprising a second hologram optical element placed between the path conversion member and the translucent concave mirror, the second hologram optical element comprising a hologram pattern configured to scatter light incident in the second direction by a given width toward the translucent concave mirror.

6. The optical window system of claim 3, wherein the path conversion member comprises a wedge-type prism comprising a plurality of wedged facets,
wherein the wedged facets are arranged in a third direction, which forms the angle with the first direction, and
wherein one or more of the wedged facets are inclined 45° with respect to the first direction.

7. The optical window system of claim 1, wherein the focusing member comprises a polarization-selective lens for light having a first polarization state and having substantially no refractive power for light having a second polarization state perpendicular to the first polarization state, and
the polarization-selective lens is placed between the path conversion member and an observer.

8. The optical window system of claim 7, wherein the path conversion member comprises a hologram optical element having a hologram pattern that is configured to change the light of the first image incident in the first direction to exit in the second direction.

9. The optical window system of claim 8, further comprises a polarizer having a polarization axis in a second polarization direction being placed on a first side of the hologram optical element opposite to a second side of the hologram optical element facing the polarization-selective lens.

10. The optical window system of claim 7, wherein the path conversion member comprises a wedge-type prism comprising a plurality of wedged facets,
wherein the wedged facets are arranged in a third direction, which forms the angle with the first direction, and
wherein one or more of the wedged facets are inclined 45° with respect to the first direction.

11. The optical window system of claim 10, further comprises a polarizer having a polarization axis in a second polarization direction being placed on a first side of the wedge-type prism opposite to a second side of the wedge-type prism facing the polarization-selective lens.

12. A see-through type display apparatus comprising:
an image forming system configured to form a first image in a first direction;
a path conversion member configured to change a path of light of the first image to a second direction, the path conversion member being translucent to a second image, which is of a real environment, incident in the second direction; and
a focusing member configured to focus the light of the first image in the second direction,
wherein the path conversion member is configured to occupy a space extending from a first side of the focusing member to a second side of the focusing member opposite to the first side, defined by a first length of the path conversion member in the first direction and a second length of the path conversion member in the second direction, and
wherein an angle defined by tan−1 (the second length/the first length) is less than 45° across the entire space.

13. The see-through type display apparatus of claim 12, wherein the angle defined by tan−1 (the second length/the first length) satisfies the following condition:

5°≤the angle≤30°.

14. The see-through type display apparatus of claim 12, wherein the focusing member comprises a translucent concave mirror, and
the path conversion member is placed between the translucent concave mirror and an observer.

15. The see-through type display apparatus of claim 14, wherein the path conversion member comprises a first hologram optical element having a hologram pattern that is configured to change the light of the first image incident in the first direction to exit in the second direction toward the translucent concave mirror.

16. The see-through type display apparatus of claim 15, further comprising a second hologram optical element placed between the path conversion member and the translucent concave mirror, the second hologram optical element comprising a hologram pattern configured to scatter light incident from the path conversion member by a given width toward the translucent concave mirror.

17. The see-through type display apparatus of claim 14, wherein the path conversion member comprises a wedge-type prism comprising a plurality of wedged facets,
wherein the wedged facets are arranged in a third direction, which forms the angle with the first direction, and
wherein one or more of the wedged facets are inclined 45° with respect to the first direction.

18. The see-through type display apparatus of claim 17, wherein the wedge-type prism comprises:
a first prism comprising a plurality of wedged facets that are mirror-coated; and
a second prism comprising a material having same refractive index as the first prism, the second prism sharing the plurality of wedged facets with the first prism.

19. The see-through type display apparatus of claim 17, wherein the wedge-type prism comprises:

a first prism comprising a plurality of wedged facets; and
a second prism comprising a material having same refractive index as the first prism, and comprising a plurality of total reflection facets parallel with the plurality of wedged facets,
wherein the second prism is spaced apart from the first prism with an air gap being therebetween.

20. The see-through type display apparatus of claim 17, further comprising a hologram optical element placed between the path conversion member and the translucent concave mirror, the hologram optical element comprising a hologram pattern configured to scatter light incident from the path conversion member by a given width toward the translucent concave mirror.

21. The see-through type display apparatus of claim 12, wherein the focusing member comprises a polarization-selective lens for light having a first polarization state and having substantially no refractive power for light having a second polarization state perpendicular to the first polarization state, and
the polarization-selective lens is placed between the path conversion member and an observer.

22. The see-through type display apparatus of claim 21, wherein the polarization-selective lens comprises:
an optically anisotropic material portion having different refractive indexes with respect to light having the first polarization state and light having the second polarization state; and
an optically isotropic material portion having same refractive index as the optically anisotropic material portion with respect to light having the second polarization state,
wherein an interface between the optically anisotropic material portion and the optically isotropic material portion is a lens surface.

23. The see-through type display apparatus of claim 21, wherein the polarization-selective lens comprises a meta lens comprising nanostructures having a sub-wavelength shape dimension.

24. The see-through type display apparatus of claim 21, wherein the polarization-selective lens comprises a geometric phase lens.

25. The see-through type display apparatus of claim 21, wherein the path conversion member comprises a hologram optical member, and the hologram optical member comprises a hologram pattern configured to change the light of the first image incident in the first direction to exit in the second direction toward the polarization-selective lens.

26. The see-through type display apparatus of claim 25, further comprising a polarizer having a polarization axis in a second polarization direction being placed on a first side of the hologram optical member opposite a second side of the hologram optical member facing the polarization-selective lens.

27. The see-through type display apparatus of claim 21, wherein the path conversion member comprises a wedge-type prism comprising a plurality of wedged facets,
wherein the wedged facets are arranged in a third direction, which forms the angle with the first direction, and
wherein one or more of the wedged facets are inclined 45° with respect to the first direction.

28. The see-through type display apparatus of claim 27, wherein the wedge-type prism comprises:
a first prism comprising a plurality of wedged facets that are mirror-coated; and
a second prism comprising a material having same refractive index as the first prism, the second prism sharing the plurality of wedged facets with the first prism.

29. The see-through type display apparatus of claim 27, wherein the wedge-type prism comprises:
a first prism comprising a plurality of wedged facets; and
a second prism comprising a material having same refractive index as the first prism, the second prism comprising a plurality of total reflection facets parallel with the plurality of wedged facets, the second prism being spaced apart from the first prism with an air gap being therebetween.

30. The see-through type display apparatus of claim 29, further comprises a polarizer having a polarization axis in a second polarization direction being placed on a first side of the wedge-type prism opposite to a second side of the wedge-type prism facing the polarization-selective lens.

31. The see-through type display apparatus of claim 12, wherein the see-through type display apparatus is a head mounted display (HMD).

32. The optical window system of claim 1, wherein the path conversion member has a patterned surface comprising a plurality of elements to change the path of the light of the first image.

33. The optical window system of claim 1, wherein the path conversion member comprises a wedge-type prism comprising a plurality of wedged facets,
wherein each of the plurality of the wedged facets are arranged in a third direction, which forms the angle with the first direction, and
wherein each of the plurality of the wedged facets are inclined 45° with respect to the first direction.

* * * * *